United States Patent [19]

Miyazawa et al.

[11] Patent Number: 5,213,752
[45] Date of Patent: May 25, 1993

[54] PROCESS OF STRETCH-BLOW MOLDING

[75] Inventors: Yoshiki Miyazawa, Ueda; Yoshihiro Fukunishi, Komoro, both of Japan

[73] Assignee: Nissei ASB Machine Co., Ltd., Nagano, Japan

[21] Appl. No.: 877,246

[22] Filed: May 1, 1992

Related U.S. Application Data

[62] Division of Ser. No. 743,912, Aug. 12, 1991, Pat. No. 5,129,815.

[30] Foreign Application Priority Data

Aug. 14, 1990 [JP] Japan .................. 2-214762

[51] Int. Cl.$^5$ ............................................. B29C 49/12
[52] U.S. Cl. ...................... 264/532; 425/529
[58] Field of Search ............... 264/532; 425/529, 535, 425/530

[56] References Cited

U.S. PATENT DOCUMENTS

| | | | |
|---|---|---|---|
| 3,865,530 | 2/1975 | Jesselallee et al. | 425/387 B |
| 3,949,033 | 4/1976 | Uhlig | 264/89 |
| 4,039,641 | 8/1977 | Collins | 264/28 |
| 4,150,689 | 4/1979 | Britten | 425/535 |
| 4,524,045 | 6/1985 | Hayashi et al. | 264/521 |
| 4,657,502 | 4/1987 | Rydmann | 425/526 |
| 4,927,679 | 5/1990 | Beck | 264/532 |
| 4,952,134 | 8/1990 | Bartley et al. | 425/525 |

FOREIGN PATENT DOCUMENTS

| | | | |
|---|---|---|---|
| 54-69178 | 6/1979 | Japan . | |
| 55-154132 | 12/1980 | Japan | 264/532 |
| 4008221 | 2/1984 | Japan | 264/532 |

Primary Examiner—Jan H. Silbaugh
Assistant Examiner—Catherine Timm
Attorney, Agent, or Firm—Oliff & Berridge

[57] ABSTRACT

The process and apparatus of stretch-blow molding a preform in the axial and radial directions into a biaxially oriented container by the use of a stretching rod assembly and a blowing of pressurized fluid. In the axially stretching step, the surface area of the working end of the stretching rod assembly is changed. The axially stretching step is carried out through a plurality of stages each of which provide a different surface area of the working end of the stretching rod assembly. The apparatus preferred to carry out this process has a plurality of concentrically disposed stretching rods and an tip piece fixedly mounted on the working end of each of the stretching rods and having an external diameter at the surface area different from those of the other stretching rods. When such stretching rods are driven independently or in combination, the bottom surface area of the stretching rod assembly to be engaged by the inner bottom wall of the preform can be easily changed.

5 Claims, 7 Drawing Sheets

PROCESS OF STRETCH-BLOW MOLDING

This is a division of application Ser. No. 07/743,912 filed Aug. 12, 1991 now U.S. Pat. No. 5,129,815.

BACKGROUND OF THE INVENTION

1. Field of the Invention

The present invention particularly relates to stretch-blow molding process and apparatus suitable for use in forming a wide-mouthed container with its lip portion having a relatively wide opening area.

2. Description of the Related Art

The conventional process of stretch-blow molding general hollow containers including wide-mouthed containers typically comprises the steps of:

(1) injection molding a preform from a thermoplastic material;

(2) regulating the temperature of the injection molded preform into an optimum level for stretch-blow molding; and (3) performing a biaxial orientation by stretching the inner bottom wall of the perform in its axial direction while maintaining the optimum temperature therein and substantially at the same time blowing a pressurized fluid into the interior of said preform to stretch the wall of the preform in its radial direction. In certain cases, the second step aforementioned may be omitted.

FIGS. 6 and 7 illustrate such a convention stretch-blow molding process. A preform 10 is placed in a blow cavity mold 16 with the outer periphery of its lip portion being fixedly supported by a lip mold 12. The inner periphery of the lip preform portion receives a blow core mold 14. The preform 10 is stretch-blow molded into the blow cavity mold 16 against its inner cavity wall to form a finished product with an outline following the inner wall of the cavity.

A vertically movable stretching rod 18 is supported by the blow core mold 14, with the lower end thereof having an tip piece 20. The tip piece 20 is adapted to engage the inner bottom wall of the preform 10. FIG. 6 shows that the tip piece 20 has a relatively small surface area while FIG. 7 shows that the tip piece 20 has a relatively large surface area.

When the stretching rod 18 is downwardly moved, the tip piece 20 is also moved to urge the bottom wall of the preform 10 in the downward direction such that the preform 10 will be stretched in the axial direction of the rod.

The blow core mold 14 includes a blow air introducing port 22 formed therein through its top wall and extending about the stretching rod 18. Usually, a compressed fluid (e.g. air) is blown into the interior of the preform 10 through the port 22 substantially at the same time when the stretching rod 18 is moved.

However, such an arrangement has the following problem during the stretching operation.

First, with the stretching rod 18 having a relatively small tip piece 20 as shown in FIG. 6, the downward movement of the stretching rod 18 sufficiently stretches portions of the preform 10 at and near a region engaged by the tip piece 20 of the rod 18 to make these portions thinner (see FIG. 8(A)). A product 24 stretch-blow molded in the biaxial orientation will include its thinner bottom and adjacent walls and thicker wall portions 24a near the lip portion of the container (see FIG. 8(B)).

On the contrary, with the arrangement as shown in FIG. 7, the tip piece 20 has a relatively large surface area. When the stretching rod 18 is moved downwardly, thus, that portion 10b of the preform 10 engaged by the tip piece 20 will not be sufficiently stretched by the tip piece 20 and remain as it is thicker (see FIG. 9(a)). After such a preform 10 has been stretch-blow molded in the biaxial orientation, thus, the bottom and adjacent walls remain thicker as shown by 26a while the wall portions near the lip portion are reduced in thickness (see FIG. 9(B)).

In accordance with the prior art, the surface area of the tip piece 20 of the stretching rod 18 adapted to engage the inner bottom wall of the preform is avoidably invariable resulting in not-uniform wall thickness throughout the molded container.

SUMMARY OF THE INVENTION

In order to overcome the aforementioned problem in the prior art, it is an object of the present invention to provide stretch-blow molding process and apparatus which can regulate the wall thickness of a container to be molded to provide a uniform thickness profile throughout the walls of the molded container, during the stretch-blow molding procedure.

To this end, the present invention provides a stretch-blow molding process comprising the steps of:

moving a stretching rod to urge and stretch the inner bottom wall of a preform in the axial direction within a blow cavity mold; and blowing a pressurized fluid into the interior of said preform to stretch the preform in the radial direction, said axially stretching step being carried out through a plurality of sub-steps while changing the surface area of the tip piece of said stretching rod engaging the inner bottom wall of said preform.

Furthermore, the present invention provides an apparatus for carrying out said stretch-blow molding process, said apparatus comprising:

a blow cavity mold;

a stretching rod disposed within said blow cavity mold and for urging the inner bottom wall of said preform to stretch said preform in the axial direction; and a blow core mold for introducing a pressurized fluid into the interior of said preform, said stretching rod comprising;

a plurality of rod sections disposed in a concentrical manner; and a tip piece fixedly provided on the forward end of each of said rod sections, these tip pieces having different exterior diameters at the respective end faces to be engaged by the inner bottom wall of a preform to be molded, said apparatus further comprising rod drive means for selecting a wide-area pressure drive mode in which all said tip pieces are simultaneously brought into engagement into the inner bottom wall of said preform and moved together in the axial direction against the inner bottom wall of said preform, and a narrow-area pressure drive mode in which only one inner tip piece or some of the inner tip pieces is/are brought into engagement with the inner bottom wall of said preform and moved in the axial direction against the inner bottom wall of the preform.

In such an arrangement, the stretching rod can have a different area to be engaged by the inner bottom wall of the preform (hereinafter called simply "contact area") in each of the different downward movement steps of the stretching rod.

Thus, the surface area of the stretching rod to be engaged by the inner bottom wall of the preform will be changed one or more times until the stretching rod reaches its final position. For example, the tip piece of the stretching rod may have a relatively narrow contact area at its first downward movement step so as to stretch a wall portion of the preform near the wall portion engaged by the tip piece of the stretching rod to a sufficient extent. In the second downward movement step, the stretching rod may have its tip piece having a relatively wide contact area. When the stretching rod is further moved downwardly in such a situation, that wall portion of the preform adjacent to the lip portion can be stretched sufficiently. On the contrary, the first downward movement step may provide a relatively wide contact area while the second downward movement step may provide a relatively narrow contact area. In any event, the wall portions of the preform at the bottom thereof and near the lip portion thereof can be appropriately stretched to regulate the profile of wall thickness, if necessary. This will provide a finished container having a uniform thickness throughout the wall portions thereof.

The stretching operation may be divided into any number of steps other than the two steps as described above.

Such a multi-step stretching process may be realized easily in accordance with the principle of the present invention. More particularly, the rod drive means may be actuated to select any one of the rod movement steps so that the various different contact areas can be freely used in the tip piece of the stretching rod.

DETAILED DESCRIPTION OF THE PREFERRED EMBODIMENTS

Figure 1:
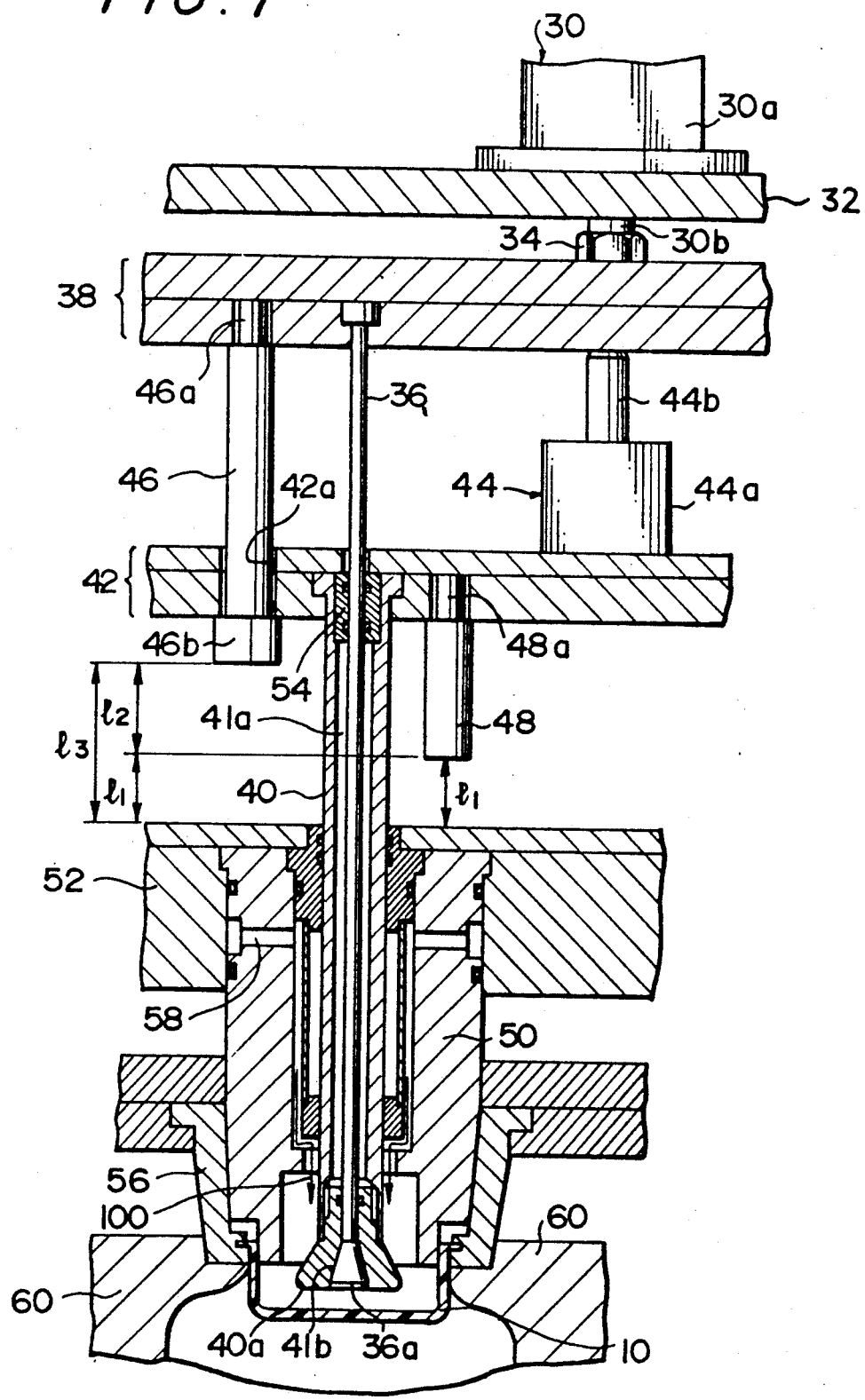
FIG. 1 is a schematically cross-sectional view of a portion of a stretch-blow molding apparatus constructed in accordance with the present invention.

Referring to FIG. 1, there is shown one embodiment of an apparatus for carrying out a process of stretch-blow molding a wide-mouthed container in accordance with the present invention. Although only one stretch-blow molding section in shown in FIG. 1, it is to be understood that a plurality of such a section may be actually disposed side by side in the same apparatus.

A wide-mouthed container will be molded from a preform 10 which has previously been molded. The preform 10 has a lip portion which is held by a lip mold 56. The preform 10 is carried to the corresponding stretch-blow molding section while the lip portion of the preform 10 is held by the lip mold 56. The stretch-blow molding section comprises a pair of blow cavity molds 60 which can be moved relative to each other to form a blow molding cavity. For example, the blow cavity molds 60 is closed against each other to form a blow molding cavity when the lip mold 56 is downwardly moved, the preform 10 being then set within this blow molding cavity, as shown in FIG. 1.

Above the blow cavity molds 60, there are a blow core mold 50 and a stretching rod portion, both of which are vertically movable relative to the blow cavity molds 60. In this embodiment, the stretching rod portion comprises two stretching rods 36 and 40 which are concentrically disposed relative to each other. More particularly, the outer cylinder-like stretching rod 40 includes a central bore 41a formed therethrough along the central axis. The inner stretching rod 36 is movably received in the central bore 41a of the outer stretching rod 40.

The vertical movement of these two stretching rods 36 and 40 is accomplished by a top fixing plate 32, an inner rod fixing plate 38 movable relative to the top fixing plate 32 and located below the top fixing plate 32 and an outer rod fixing plate 42 movable relative to the top fixing plate 32 and the inner rod fixing plate 38 and located below the inner rod fixing plate 38. The top fixing plate 32 is also vertically movable integrally with a blow core mold fixing plate 52 on which the blow core mold 50 is fixedly mounted. The downward movement of the blow core mold fixing plate 52 sets the blow core mold 50 and the two stretching rods 36 and 40 as shown in FIG. 1. Air can be blown into the interior of the preform 10 through flow passages 58 formed in the blow core mold 50, as shown by arrow 100 in FIG. 1.

A primary air cylinder 30 is provided which drives the inner rod fixing plate 38. The primary cylinder 30 includes a cylinder portion 30a fixed to the top fixing plate 32 and a piston rod 30b which is connected, at its outer end, with the inner rod fixing plate 38 through a connection 34. In such a manner, the inner stretching rod 36 can be vertically driven by the primary cylinder 30.

The outer rod fixing plate 42 is fixedly connected with a cylinder portion 44a in a secondary air cylinder 44 which also includes a piston rod 44b connected with the inner rod fixing plate 38. When the secondary cylinder 44 receives a pressurized air, it only transmits the downward movement of the inner rod fixing plate 38 to the outer rod fixing plate 42 without change in the distance between these fixing plates 38 and 42. When the pressurized air is drawn out of the secondary cylinder 44, the piston rod 44b is backwardly moved to absorb the downward movement of the inner rod fixing plate 38 such that this downward movement will not be transmitted to the outer rod fixing plate 42.

The inner rod fixing plate 38 also includes a stopper 46 for restricting the lower position of the inner rod fixing rod 36, the stopper 46 being fixedly mounted on the fixing plate 38 through a threaded portion 46a. The stopper 46 includes a flange portion 46b formed therein at the lower end of the stopper 46 which downwardly extends through an opening 42a formed through the outer rod fixing plate 42. As the flange portion 46b is engaged by the blow core fixing plate 52, the downward movement of the inner stretching rod 36 will be stopped. When the pressurized air enters the secondary air cylinder 44 to drive the piston rod 30b of the primary air cylinder 30, the inner and outer rod fixing plates 38 and 42 can be moved downwardly as a unit.

The outer rod fixing plate 42 also includes a stopper 48 for determining the lower position of the outer stretching rod 40, the stopper 48 being fixedly mounted on the outer rod fixing plate 42 through a threaded portion 48a. Assuming that the distance between the lower end of the stopper 48 and the blow core mold fixing plate 52 is l1 and the independent downward stroke of the inner stretching rod 36 is l2, it is arranged such that the distance l3 between the lower end of the flange portion 46b and the blow core mold fixing plate 52 is represented by:

$$l3 = l1 + l2.$$

Guide means 54 is provided such that the inner stretching rod 36 can be smoothly moved through the central bore 41a in the outer stretching rod 40.

The inner stretching rod 36 includes an inner tip piece 36a formed thereon at the lower end while the outer stretching rod 40 includes an outer tip piece 40a formed thereon at the lower end. In such a state as shown in FIG. 1, the bottom faces of these tip pieces 36a and 40a are flush with each other.

The outline of the outer tip piece 40a is of a reverse tapered configuration which increases in external diameter proceeding to the outer end thereof. The outer tip piece 40a includes a central reverse tapered recess 41b formed therein and communicating with the central bore 41a. The inner tip piece 36a is similarly of a reverse tapered configuration which is snugly fitted into the reverse tapered recess 41b of the outer tip piece 40. Thus, the inner and outer tip pieces 36a and 40a can be placed flush with each other at their bottom faces.

In operation, the primary air cylinder 30 is first energized to move the inner rod fixing plate 38 downwardly. At this step, if the secondary air cylinder 44 receives the pressurized air, the outer rod fixing plate 42 will be also moved downwardly as a unit. The downward movement is continued until the stopper 48 engages the blow core mold fixing plate 52.

Figure 2A:
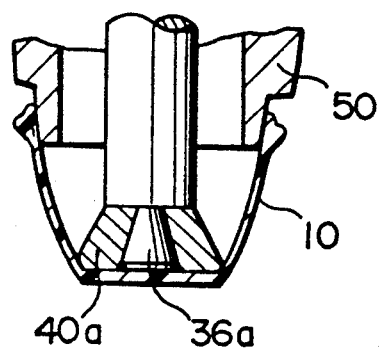
FIGS. 2(A) and (B) illustrate the positions of the stretching rod and preform in the apparatus of FIG. 1 at various steps.

FIG. 2(A) shows when the downward movement done in the first step is terminated. At this time, both the inner and outer tip pieces 36a and 40a engage the preform 10 with an increased surface area. Thus, the wall portion of the preform 10 engaged by the inner and outer tip pieces 36a and 40a remains relatively thicker while the other wall portion above the thicker wall portion is stretched to make thinner.

Figure 2B:
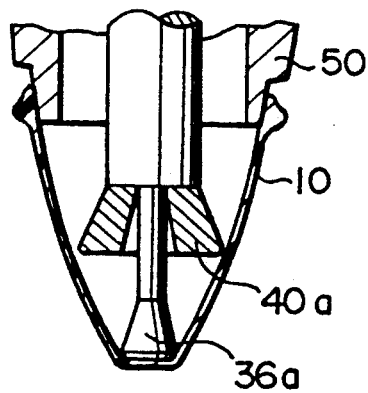

At the second step, the main air cylinder 30 continues to be energized to move the inner rod fixing plate 38 downwardly. On the other hand, the pressurized air is drawn out of the secondary air cylinder 44. Therefore, the piston rod 44b is retracted to absorb this downward movement of the inner rod fixing plate 38. At the same time, the outer rod fixing plate 42 is stopped in place by the stopper 48. As a result, only the inner stretching rod 36 is further moved downwardly until the stopper 46 engages the top of the blow core mold fixing plate 52. This state is shown in FIG. 2(B). Thus, the thicker wall portion of the preform 10 at and near its bottom is stretched by the inner stretching rod 36. However, the upper wall portion of the preform 10 will not be very stretched. Therefore, the entire wall thickness of the stretched preform 10 becomes substantially uniform.

Although the primary air cylinder 30 is used at the second step, the secondary air cylinder 44 may be energized to move the inner rod fixing plate 38 downwardly.

In accordance with the present embodiment, the first step provides a relatively wide contact area by the inner and outer tip pieces 36a and 40a which are placed to be flush with each other at the bottom faces. The second step provides a relatively small contact area only by the inner tip piece 36a. In such a manner, the preform 10 can be stretched throughout into a uniform wall thickness. Since the pressurized fluid is substantially simultaneously blown into the interior of the stretched preform 10, the latter will be further stretched toward the inner wall of the blow cavity mold 60 to form a product having a desired outline.

Figure 3:
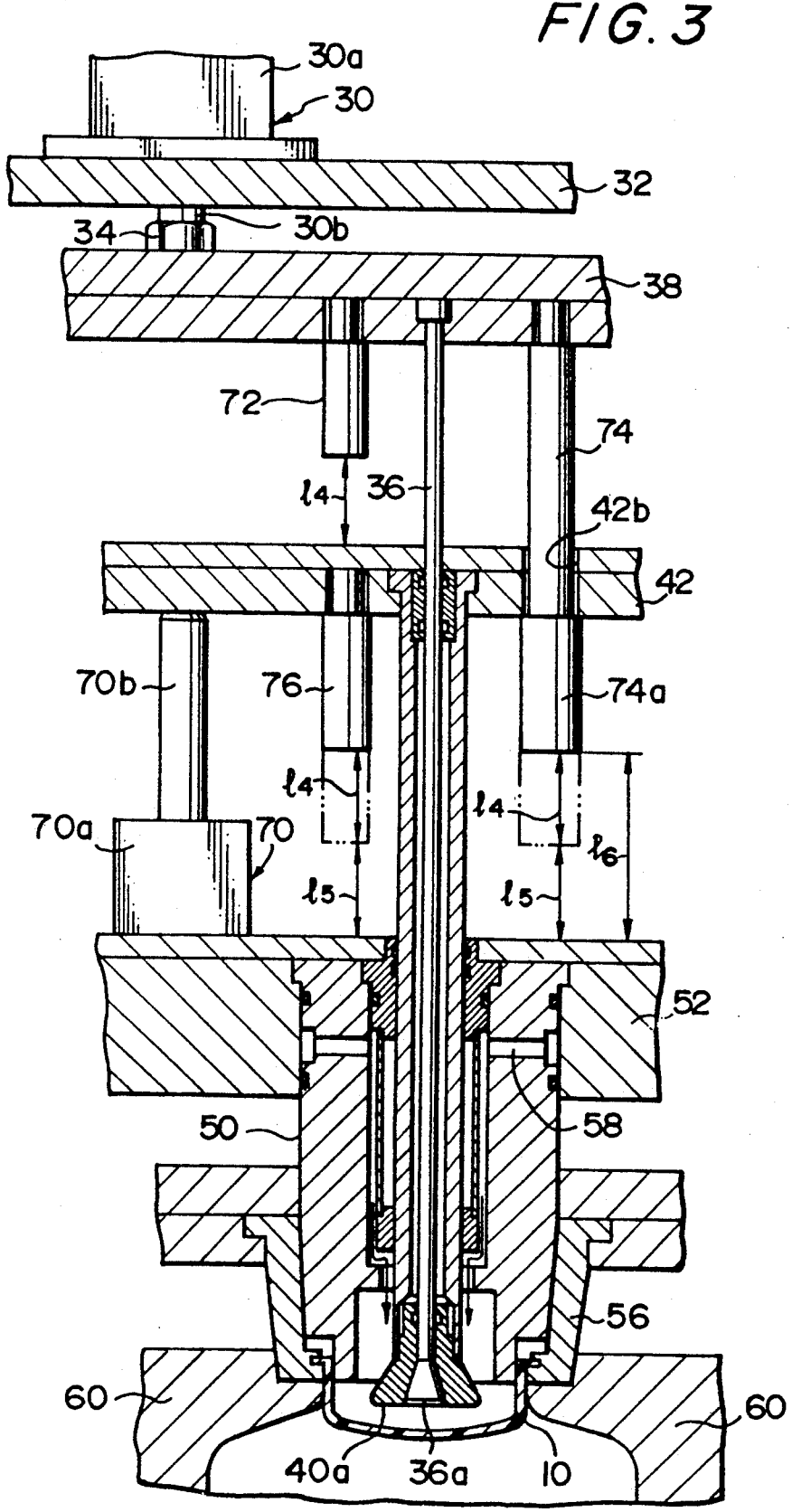
FIG. 3 is a schematically cross-sectional view of a portion of another embodiment of the present invention.

FIG. 3 shows another embodiment of the present invention, in which parts similar to those of the first embodiment shown in FIG. 1 are designated by similar reference numerals and will not be further described herein.

The second embodiment of FIG. 3 is different from the first embodiment of FIG. 1 in that the secondary air cylinder 44 is omitted and another secondary air cylinder 70 is disposed between the outer rod fixing plate 42 and the blow core mold fixing plate 52. The secondary air cylinder 70 includes a cylinder section 70a fixedly connected to the blow core mold fixing plate 52 and a piston rod 70b fixedly connected to the outer rod fixing plate 42. The inner rod fixing plate 38 includes a stopper 72 for restricting the downward movement of the inner stretching rod 36 through a distance l4. The inner rod fixing plate 38 also includes another stopper 74 while the outer rod fixing plate 42 includes a stopper 76. The stopper 74 extends downwardly through an opening 42b formed in the outer rod fixing plate 42 and has a flange portion 74a formed on the stopper 74 at its lower end. The lower end faces of the flange portion 74a and stopper 76 are positioned at the same level from the blow core mold fixing plate 52, that is, a distance l6.

Figure 4A:
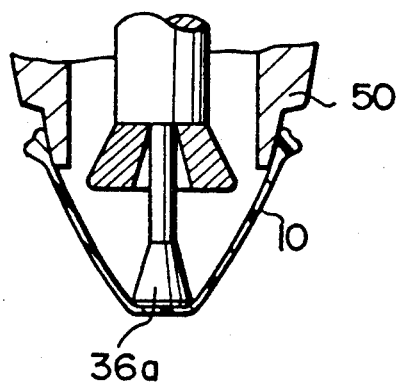
FIGS. 4(A), 4(B) and 4(C) illustrate various steps when the apparatus shown in FIG. 3 is actuated.

In operation, the first step is to energize the primary air cylinder 30 to move the inner rod fixing plate 38 downwardly. The inner stretching rod 36 then begins to move downwardly and is stopped when the stopper 72 moves through the distance l4 and reaches the outer rod fixing plate 42, as shown in FIG. 4(A). The bottom of the preform 10 is stretched only by the inner tip piece 36a having a relatively small contact area to provide a relatively thin wall portion at the bottom side of the preform 10, the other wall portion of the preform 10 adjacent to the lip portion remaining thicker.

Figure 4B:
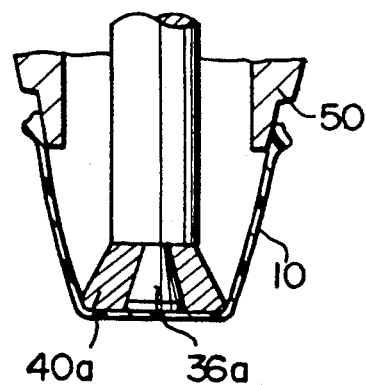

At the second step, the secondary air cylinder 70 is actuated to move only the outer rod fixing plate 42 downwardly. This downward movement of the plater 42 continues until the lower end of the outer stretching rod 40 reaches the same level as the lower end of the inner stretching rod 36 previously moved downwardly, that is, until the bottom of the outer rod fixing plate 42 moves through the distance l4 and reaches the top of the flange portion 74a, as shown in FIG. 4(B).

Figure 4C:
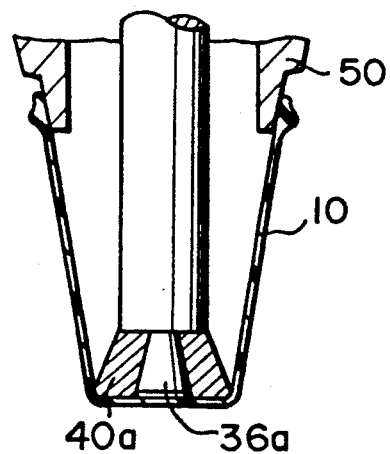
Figure 5:
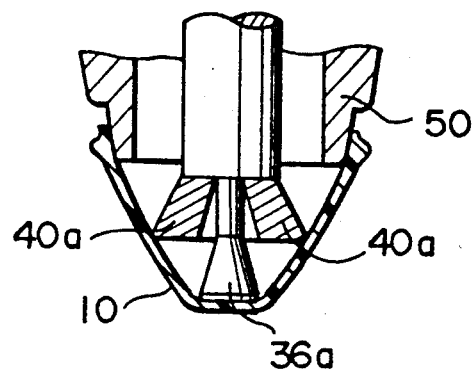
FIG. 5 is a schematically cross-sectional view illustrating the tip pieces of the stretching rod at their various actuating positions.
Figure 6:
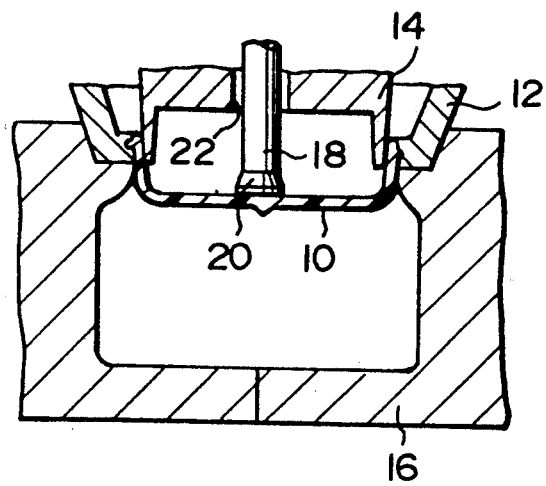
FIGS. 6 and 7 are schematically cross-sectional view of a part of the conventional apparatus.
Figure 7:
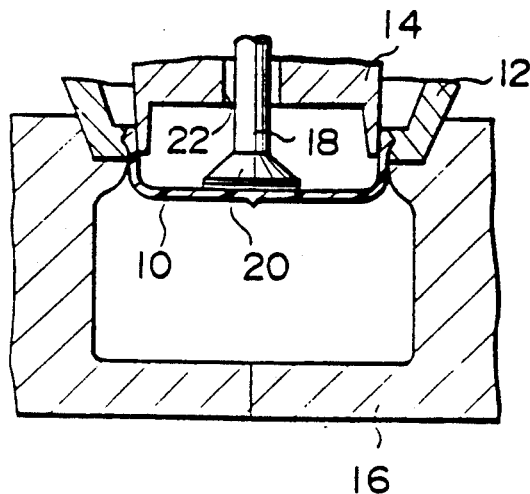
Figure 8A:
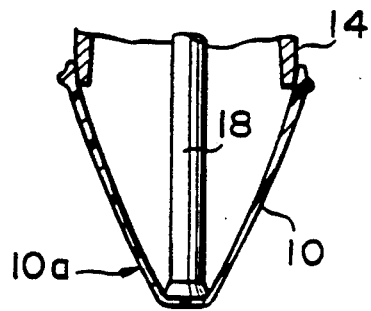
FIGS. 8(A) and (B) show the operation of the prior art apparatus shown in FIG. 6 and a container molded by this apparatus.
Figure 8B:
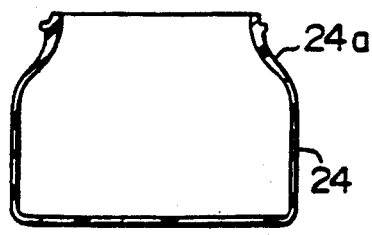
Figure 9A:
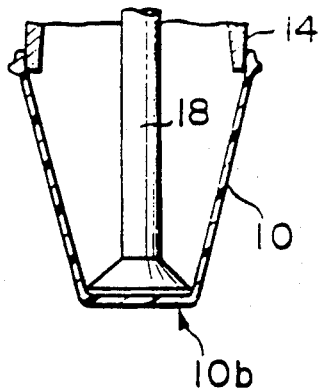
FIGS. 9(A) and (B) show the operation of the prior art apparatus shown in FIG. 7 and a container molded by this apparatus.
Figure 9B:
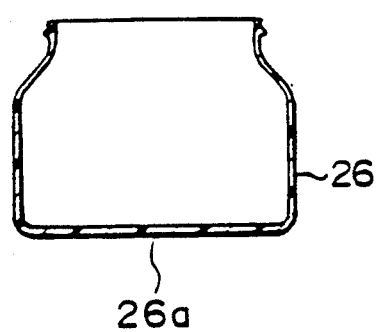

The secondary air cylinder 70 is further actuated to move the outer rod fixing plate 42 to its lowermost position at which the stopper 74 reaches the top face of the blow core mold fixing plate 52. At this time, the inner rod fixing plate 38 is simultaneously moved downwardly by the flange portion 74a of the stopper 74 engaged by the outer rod fixing plate 42. In such a manner, the inner and outer stretching rods 36 and 40 are downwardly moved as a unit to their lowermost positions through a distance 15, as shown in FIG. 4(C).

The second step stretches the wall portion of the preform 10 adjacent to the lip portion thereof to make the entire wall thickness of the preform substantially uniform.

In accordance with the second embodiment, the first step provides a relatively small contact area and the second step provides a relatively large contact area. As a result, the preform may be stretched to have the entire substantially uniform wall thickness, as in the first embodiment.

In the previous embodiments of the present invention, the inner and outer tip pieces 36a and 40a are first set to be flush with each other at their bottom faces and one or both of these tip pieces are then driven. However, the inner and outer tip pieces 36a and 40a may be initially set such that the inner tip piece 36a extends downwardly beyond the outer tip piece 40a. From such a situation, the stretching rod assembly may be downwardly moved against the bottom and side walls of the preform 10 to perform the first axially stretching step. This is particularly suitably applicable to the molding of a preform of a configuration having its not-flat bottom, such as a semi-spherical preform. At the second axially stretching step, only the inner tip piece 36a or both the inner and outer tip pieces 36a and 40a are caused to engage and stretch the preform.

Although the previous embodiments of the present invention have been described as to the molding of a wide-mouthed container with a lip portion having an opening relatively larger than the external diameter of the container barrel, the present invention can be similarly applied to the other containers having various different configurations. In accordance with the present invention, particularly, the inner tip piece having its smaller external diameter may be used, at the axially stretching step, to stretch the center of the bottom and adjacent wall portions of the preform which would otherwise be hard to be stretched. Even a carbonated beverage bottle required to have certain resistance to pressure and heat may be improved in mechanical strength by stretching the central bottom wall thereof in the biaxial orientation. This also contributes to reduce the weight of the container. Furthermore, the amount of material required to injection mold a preform by one shot may be decreased to save the material.

We claim:

1. A stretch-blow molding process comprising the steps of:

moving a stretching rod having a tip piece to urge and stretch the inner bottom wall of a preform in the axial direction within a blow cavity mold; and blowing a pressurized fluid into the interior of said preform to stretch the preform in the radial direction, said axially stretching step being carried out through a plurality of sub-steps while changing the shape of the tip piece of said stretching rod thus changing the surface area of the tip piece of said stretching rod to vary the contact area of the tip piece engaging the inner bottom wall of said preform.

2. A process as defined in claim 1 wherein said axially stretching step includes a first stage of axially stetching said preform by the tip piece of said stretching rod which is reduced in contact area and a second stage of axially stretching the preform by the tip piece of said stretching rod which is increased in contact area.

3. A process as defined in claim 1 wherein said axially stretching step includes a first stage of axially stretching said preform by the tip piece of said stretching rod which is increased in contact area and a second stage of axially stretching the preform by the tip piece of said stretching rod which is reduced in contact area.

4. A process as defined in claim 1 wherein said preform is used to mold a wide-mouthed container.

5. A process as defined in claim 1 wherein a container stretch-blow molded from said preform is a pressure- and heat-resistant container having a stretched thin-wall at and near the center of the bottom.

* * * * *